US012196455B1

United States Patent
Alaqel et al.

(10) Patent No.: US 12,196,455 B1
(45) Date of Patent: Jan. 14, 2025

(54) THERMAL ENERGY STORAGE BIN FOR A HIGH TEMPERATURE, PARTICLE-BASED SOLAR POWER PLANT

(71) Applicant: KING SAUD UNIVERSITY, Riyadh (SA)

(72) Inventors: Shaker Saeed Mohammed Abdullah Alaqel, Riyadh (SA); Rageh Saadallah Ali Saeed, Riyadh (SA); Nader Shaif Saleh, Riyadh (SA); Eldwin Djajadiwinata, Riyadh (SA); Saeed Mohammed Alzahrani, Riyadh (SA); Hany Abdurrahman Al-Ansary, Riyadh (SA); Abdelrahman Mahmoud Elleathy, Riyadh (SA); Sheldon Jeter, Atlanta, GA (US); Zeyad Abdulrahman Alsuhaibani, Riyadh (SA); Zeyad Ammar Almutairi, Riyadh (SA); Syed Noman Danish, Riyadh (SA)

(73) Assignee: KING SAUD UNIVERSITY, Riyadh (SA)

(*) Notice: Subject to any disclaimer, the term of this patent is extended or adjusted under 35 U.S.C. 154(b) by 0 days.

(21) Appl. No.: 18/678,497

(22) Filed: May 30, 2024

(51) Int. Cl.
*F24S 60/00* (2018.01)
*F24S 80/00* (2018.01)

(52) U.S. Cl.
CPC .......... *F24S 60/00* (2018.05); *F24S 2080/011* (2018.05)

(58) Field of Classification Search
CPC .............................. F24S 60/00; F24S 2080/011
(Continued)

(56) References Cited

U.S. PATENT DOCUMENTS

| 4,993,481 A | 2/1991 | Kamimoto et al. |
| 6,540,510 B1 * | 4/2003 | Abdullah .................. C10J 3/00 432/252 |

(Continued)

FOREIGN PATENT DOCUMENTS

| CN | 201218684 Y | 4/2009 |
| CN | 101738120 B | 6/2012 |

(Continued)

OTHER PUBLICATIONS

Ortega-Fernández, et al.; Operation strategies guideline for packed bed thermal energy storage systems:, International Journal On Energy Research, Special Issue Research Article, First published: Nov. 22, 2018.

*Primary Examiner* — Vivek K Shirsat
(74) *Attorney, Agent, or Firm* — Nath, Goldberg & Meyer; Joshua B. Goldberg

(57) ABSTRACT

A thermal energy storage (TES) bin assembly for a high temperature, particle-based solar power plant, the TES bin assembly including a TES bin for storing hot particles therein and a feeder assembly configured to insert the hot particles inside of the TES bin. The TES bin has a base, a lid separated from the base, and a hollow body extending between the base and the lid. The hollow body is made of a plurality of cylindrically shaped structures. The innermost cylindrically shaped structure defines an interior of the TES bin together with the lid and the base. The innermost cylindrically shaped structure is made with abrasion resistant bricks. A second cylindrically shaped structure is made of an insulating material and surrounds the second structure. A third cylindrically shaped structure surrounds the second structure and includes expansion joints. The base has a funnel shape and the lid has a removable component.

17 Claims, 15 Drawing Sheets

(58) Field of Classification Search
USPC ........................................ 126/620, 400, 709
See application file for complete search history.

(56) References Cited

U.S. PATENT DOCUMENTS

| | | | |
|---|---|---|---|
| 11,255,575 | B2 | 2/2022 | Abbasi et al. |
| 2015/0034138 | A1* | 2/2015 | Himmer ................ H10N 10/17 |
| | | | 136/205 |
| 2020/0290926 | A1 | 9/2020 | Lamperti Tornaghi et al. |

FOREIGN PATENT DOCUMENTS

| | | | |
|---|---|---|---|
| CN | 216909570 | U | 7/2022 |
| GB | 2173886 | A | 10/1986 |
| KR | 2008094864 | A * | 10/2008 |
| RU | 166409 | U1 | 11/2016 |
| WO | 2023115098 | A1 | 6/2023 |

* cited by examiner

THERMAL ENERGY STORAGE BIN FOR A HIGH TEMPERATURE, PARTICLE-BASED SOLAR POWER PLANT

TECHNICAL FIELD

The present invention relates to a solar power plant, and more particularly, to a thermal energy storage bin of a high temperature, particle-based power tower plant.

DISCUSSION OF THE RELATED ART

Particle-based concentrated solar power (PBCSP) technology is considered a feasible and energy efficient solution for some locations such as the Middle East and North Africa (MENA), which have a high direct normal irradiance (DNI) from the sun. A PBCSP system includes several key components such as a particle heating receiver (PHR), a high-temperature thermal energy storage (HT-TES) bin, a particle to fluid heat exchanger (PFHX), a low-temperature thermal energy storage (LT-TES) bin, and a particle lift system (PLS). In a typical cycle of the PBCSP system, particles are introduced at the top of the PHR where they get heated to high temperatures by the concentrated solar radiation coming from the surrounding heliostat field. The heated particles subsequently flow into the HT-TES bin, where they can either be stored for a long period of time in order to enable the power plant to be operated when sunlight is not available (e.g., at night) or when the sunlight is not strong enough (e.g., low DNI operation). Alternatively, or in addition, the heated particles stored into the HT-TES bin can be passed through the PFHX without delay to energize the power generation cycle. Particles leaving the PFHX enter the LT-TES from where they may be conveyed again to the top of the PHR via the PLS.

This technology can produce dispatchable, carbon-free electricity, long-term energy storage, and high-temperature industrial heat. The usage of particles allows for higher temperatures (~1000° C.) which can result in higher thermal efficiencies and lower costs for CSP applications. Achieving high-temperature operation of PBCSP system is an incredibly challenging task since there are numerous considerations in play, including the storage and movement of hot particles.

The implementation of thermal energy storage (TES) in concentrating solar power (CSP) systems is experiencing a surge in popularity due to its notable economic advantages, including a reduced levelized cost of energy (LCOE), enhanced dispatchability, and improved capacity factor. Utilizing solid particles as both the working and storage medium in CSP systems offers a solution to challenges encountered with molten salt, such as stability limitations, corrosion concerns, the requirement for heat tracing, and operating temperature considerations.

The design of thermal energy storage (TES) bins plays a critical role in ensuring the uninterrupted operation of the power cycle round the clock. Achieving a thermally efficient and cost-effective design involves considering various factors related to material selection and bin operation. In terms of TES construction materials, the chosen materials must exhibit acceptable thermal conductivity at high operating temperatures (>1200° C.), possess good resistance to erosion, demonstrate structural stability against cyclic heating and resulting thermal stresses, and be cost-effective. Heat losses during the charging and discharging of the TES bin contents should be low. The flow pattern of particles within the TES is influenced by factors such as the shape of the bin (conical or with a flat bottom), the aspect ratio (ratio of diameter to height), and the characteristics of the particles used (e.g., shape, diameter, material density, cohesiveness, etc.).

For example, in simulation of the operation of a 300 kWth plant PBSCP, a notable temperature drop was observed along the particle flow path from the PHR outlet to the heat exchanger inlet, said path passing through the TES bin. This results in a significant loss of solar energy before it can reach the heat exchanger, adversely impacting the overall plant performance. Relevant literature is silent on addressing this problem. Therefore, a comprehensive design for a TES bin that effectively harnesses the stored thermal energy, addressing the aforementioned challenge, is desirable.

SUMMARY

The present subject matter relates to a thermal energy storage (TES) bin of a high temperature, particle-based solar power plant and to a feeder assembly configured to direct hot particles inside of the TES bin. It is crucial for the hot particles flowing into the TES bin to lose as little heat as possible along their trip into the bin via the feeder assembly and to lose as little heat as possible once stored inside of the bin. Entrained air can get drawn in by the hot particles as they descend toward the TES bin. The introduction of entrained air in the TES bin can cause a significant loss of heat in the power plant (and therefore reduces the operational efficiency of the solar plant). The configuration of the feeder assembly and the configuration of the TES bin minimizes the introduction of entrained air into the TES bin, and also minimizes the occurrence of air loops inside of the TES bin. This, in turn, increases the plant's operational efficiency.

The feeder assembly of the present subject matter includes several components and a valve that are used together to control the way that the hot particles travel downwardly toward the TES bin in order to minimize the amount of entrained air that is captured and bring down while the particles descend into the bin. The present subject matter includes utilizing particle flow management techniques.

More specifically, the feeder assembly includes a hopper with a filtering medium at its bottom for filtering impurities from the hot particles, and a weighted door located downstream of the hopper.

The hopper is operated in a full state (e.g., full of particles) in order to avoid or significantly reduce the formation of air gaps. The full state operation reduces entrained air and the possibility of forming air loops inside of the hopper. The filtering medium also impedes the natural upwardly flow of hot air from below, which in turn prevents hot air escaping upwardly from below the hopper.

The weighted door is spring loaded and remains normally closed. The closed state prevents hot air from escaping upwardly from inside of the TES bin, thereby reducing heat losses in the bin. Once a sufficient quantity of hot particles accumulates on top of the door (having been filtered by the hopper and fallen downwardly onto the door), the weight of the particles overcomes the spring force and the door opens, enabling the hot particles to be poured into the TES bin via gravity. The door then closes after discharging the particles due to the biasing action of the spring. The intermittent feeding of the particles into the bin via the spring-loaded door reduces heat losses not only by keeping the particle conduit closed (via the spring-loaded door) but also by reducing entrained air from reaching inside of the bin. This is so because, by gathering a sufficiently large quantity of hot particles before discharging them into the bin at once, the falling particles would fill virtually the entire cross-section of the conduit, therefore, leaving less space for air gaps to form between the particles as they descend. This configuration also reduces the formation of air loops inside of the TES bin, thereby further reducing heat losses.

The TES bin of the present subject matter has an insulated structure that is configured to minimize heat loss in the particles stored inside of it. In addition, the TES bin is built by using materials and construction methods that prevent the occurrence of structural damage from thermal stress in the bin's walls, bottom and lid.

More particularly, the TES bin has a multi-layered funnel-shaped bottom to improve the discharge efficiency of the hot particles stored therein, a lid with a removable central portion to provide access into the bin's interior, and a multi-layered circular wall structure that extends between the bottom and lid and connects the bottom and lid to one another.

The multi-layer construction of the bottom and walls of the TES bin provides not only thermal insulation, but also prevents structural damage from occurring to the bin by enabling inner insulating layer(s) of the bin to freely expand from heat to a certain degree with virtually no constraint from other surrounding structural components.

The combined structure of the TES bin and the bin feeder assembly contribute to a significant heat loss reduction in the solar plant while allowing for maintenance to be performed easily and safely.

BRIEF DESCRIPTION OF THE DRAWINGS

The above and other features of the present subject matter will become more apparent by describing in detail exemplary embodiments thereof in conjunction with the accompanying drawings, in which.

DETAILED DESCRIPTION OF THE EMBODIMENTS

Figure 1:
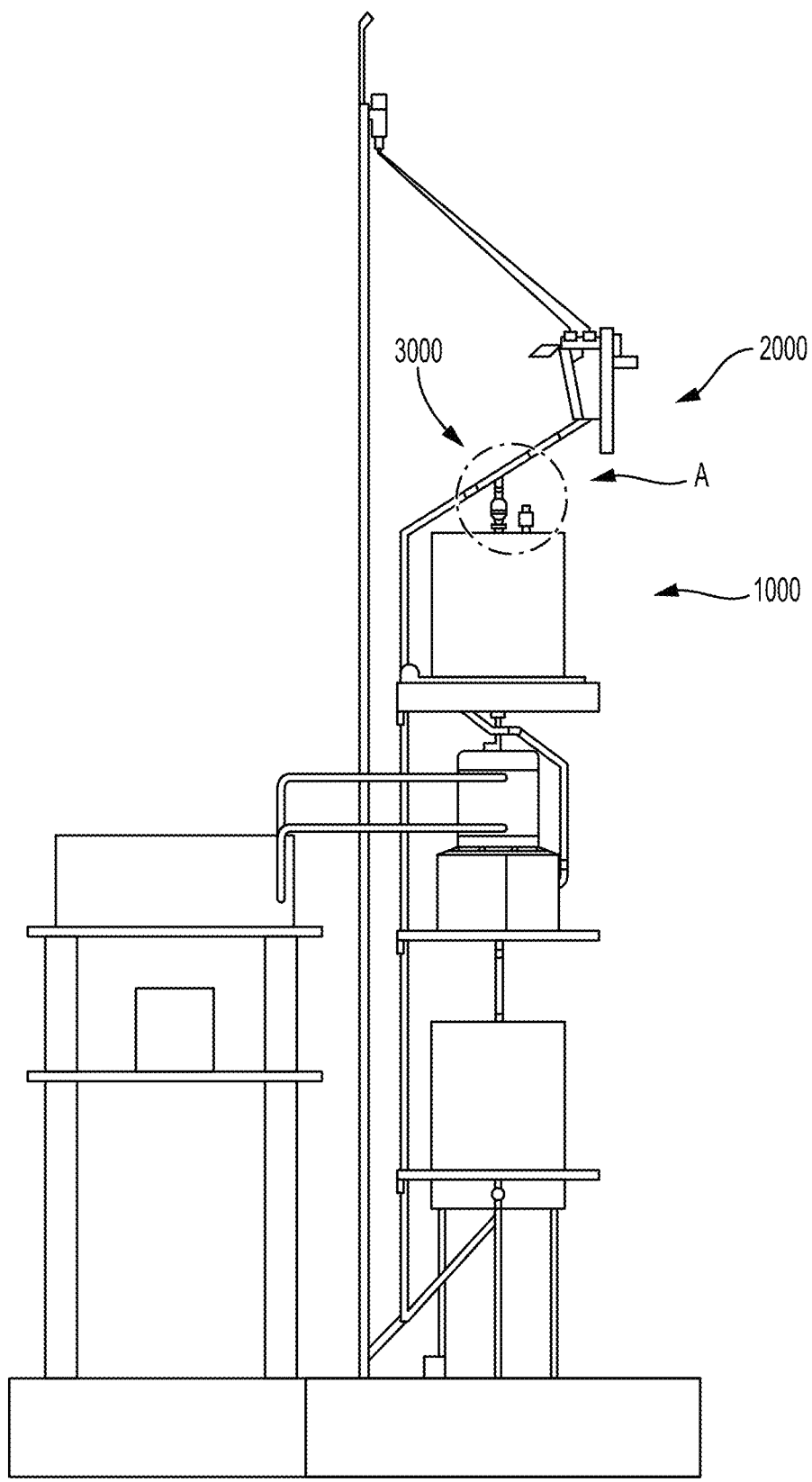
FIG. 1 is a side view illustrating a high temperature, particle-based power tower plant according to an exemplary embodiment of the present subject matter.

Exemplary embodiments of the present subject matter will be described more fully hereinafter with reference to the accompanying drawings. The present subject matter may, however, be embodied in different forms and should not be construed as being limited to the embodiments set forth herein. Like reference numerals may refer to like elements throughout the specification. The sizes and/or proportions of the elements illustrated in the drawings may be exaggerated for clarity.

When an element is referred to as being disposed on another element, intervening elements may be disposed therebetween. In addition, elements, components, parts, etc., not described in detail with respect to a certain figure or embodiment may be assumed to be similar to or the same as corresponding elements, components, parts, etc., described in other parts of the specification.

FIGS. 1-12 illustrate a high temperature, particle-based power tower plant according to an embodiment of the present subject matter. As illustrated in FIG. 1, the power plant includes a thermal energy storage (TES) bin 1000, a particle heating receiver (PHR) 2000 disposed above the TES bin 1000, and a feeder assembly 3000 connected to the PHR 2000 and to the TES bin 1000. The PHR 2000 is configured to heat the particles of the power plant by solar radiation directed thereon to form hot particles. The feeder assembly 3000 is configured to transmit the heated particles downwardly from the PHR 2000 and into the TES bin 1000. The hot particles can be stored inside the TES bin 1000 and can then be selectively discharged from the bin 1000 to be used for various purposes within the power plant (e.g., to supply heat to a heat exchanger of the plant).

Figure 6:
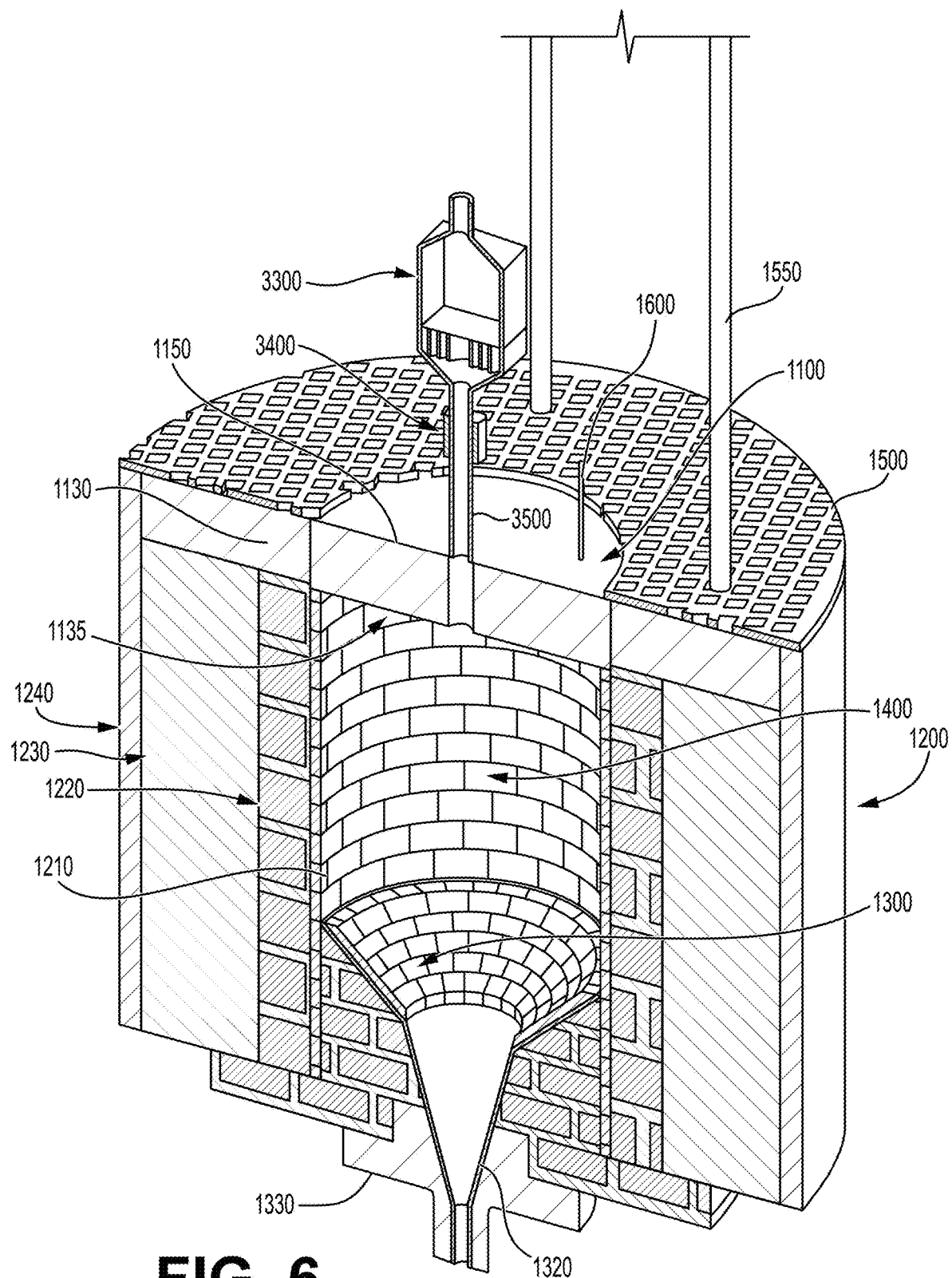
FIG. 6 is a perspective cutaway view illustrating a thermal energy storage (TES) bin included in the power plant of FIG. 1.

Referring to FIG. 6, the TES bin 1000 includes a base assembly 1300 (or simply a "base"), a lid assembly 1100 (or simply a "lid"), and a hollow elongated body 1200 extending between the base 1300 and the lid 1100. As illustrated in FIG. 6, the elongated body 1200 defines an interior storage area 1400 of the TES bin 1000 together with the base 1300 and the lid 1100.

The lid 1100 of the TES bin 1000 is constructed with an insulating material in order to minimize conductive heat loss therethrough. For example, the lid 1100 of the TES bin 1000 may include superwool, an insulating material offered for sale by the Lynn Manufacturing, Inc., of Lynn, Massachusetts. In addition, the lid 1100 is configured to minimize any entrained air from entering the interior 1400 in conjunction with the feeder assembly 3000, thereby eliminating or significantly reducing the generation of air loops inside the TES bin 1000.

Referring to FIG. 6, the lid 1100 of the TES bin 1000 includes into two parts: a first fixed lid component 1130 and a second lid component 1150 that is removably coupleable with the first lid component 1130. The first lid component 1130 may have a round slab shape with a through opening 1135 in the middle. The through opening 1135 of the fixed lid component 1130 accommodates the second lid component 1150 therein. The first lid component 1130 may cover completely all of the layers of the elongated body 1200 of the TES bin 1000 from above.

The second lid component 1150 is removable in order to enable a visual inspection of the bin's interior when needed. For example, when an inspection of the bin's interior is needed, the second lid component 1150 can be uncoupled from the first lid component 1130, and a safety cage can be inserted in its place. The safety cage is configured to ensure the safety of personnel during the inspection process.

As illustrated in FIG. 6, a steel grate 1500 can be disposed on the first lid component 1130. The steel grate 1500 is configured to protect the first lid component 1130 during the inspection process and at other times from damage from above. The steel grate 1500 can expand over the entire area of the first lid component 1130. The multi-component arrangement of the lid 1100 with the protective grate 1500 thereon allows for an effective and safe inspection of the TES bin 1000, ensuring that any necessary maintenance or checks can be carried out while preserving the integrity of the insulation and overall system. A structural component 1550 can be used to hold the grate 1500 over the lid 1100.

As illustrated in FIG. 6, the TES bin 1000 includes a pressure relief valve 1600. The pressure relief valve 1600 may be installed through the second lid component 1150 in order to control and release excess air pressure that may accumulate inside the TES bin 1000 during operation, especially when filling the bin from an empty state with hot particles.

When selecting construction materials for the bin walls (e.g., the elongated body 1200) and the base 1300, it is important to consider materials that exhibit a low thermal conductivity at high operating temperatures, possess structural stability against cyclic heating and resulting thermal stresses, and are cost-effective. The present subject matter discloses a multi-layered wall (e.g., a multi-layered elongated body 1200) that meets all of these considerations. The multi-layered body 1200 will now be described in detail.

Referring to FIG. 6, the body 1200 of the TES bin 1000 includes a plurality of layers. Said layers form elongated tubular structures that extend between the base 1300 and lid 1100. Therefore, the layers of the body 1200 may also be referred to as hollow structures, hollow bodies, or simply, as "walls".

Referring to FIG. 6, the plurality of layers of the body 1200 include a first layer 1210 (e.g., the innermost layer) having a hollow cylindrical shape that extends between the base 1300 and the lid 1100 and defines the interior 1400 of the TES bin 1000 together with the base 1300 and the lid 1100, a second layer 1220 surrounding the first layer all-around and extending between the base 1300 and lid 1100 of the TES bin 1000 (e.g., disposed on an exterior of the first layer 1210), a third layer 1230 surrounding the second layer 1220 all-around and extending between the base 1300 and the lid 1100 of the TES bin 1000 (e.g., disposed on an exterior of the second layer 1220), and a fourth layer 1240 surrounding the third layer 1230 all-around and extending between base 1300 and the lid 1100 of the TES bin 1000 (e.g., disposed on an exterior of the third layer 1230). The fourth layer 1240 defines an exterior of the TES bin body 1200. As illustrated in FIG. 6, the first to fourth layers 1210-1240 may be concentrically arranged.

While each one of the first to fourth layers 1210-1240 is illustrated in the drawings as having a hollow cylindrical shape, the present subject matter is not limited to this configuration. For example, each one of the first to fourth layers 1210-1240 can have a non-circular cross-section or a cross-section having curved, straight and/or irregularly shaped portions. In this case, the base 1300 and the lid 1100 of the TES bin 1000 can be modified to have a matching shape.

The hot particles flowing in and out of the TES bin 1000 are abrasive in nature. The abrasion of the interior of the TES bin 1000 is disadvantageous not only because it consumes the interior of the bin, but also because the abraded material mixes with the hot particles and contaminates the conduits and other components of the power plant downstream and upstream of the TES bin 1000 as it travels therealong together with the hot particles. Therefore, the abrasion of the interior of the TES bin 1000 should be prevented or at least significantly limited.

One approach to limiting the abrasion of the TES interior includes lining the innermost layer of the bin with an abrasion-resistant material. In this case, it is important to consider matching the thermal expansion of the innermost layer and the liner material. A mismatch in thermal expansion over time could lead to stress concentration and the development of cracks.

The present subject matter contemplates not including lining the interior of the bin in order to avoid cracks from forming on the inside of the TES bin 1000. Instead, in the present subject matter the innermost layer of the bin 1210 (i.e., the first layer 1210) is formed of bricks that have a high resistance to abrasion and to cracking from heat, and more particularly, Mullite-based High Duty Firebricks (HDFBs).

Figure 7:
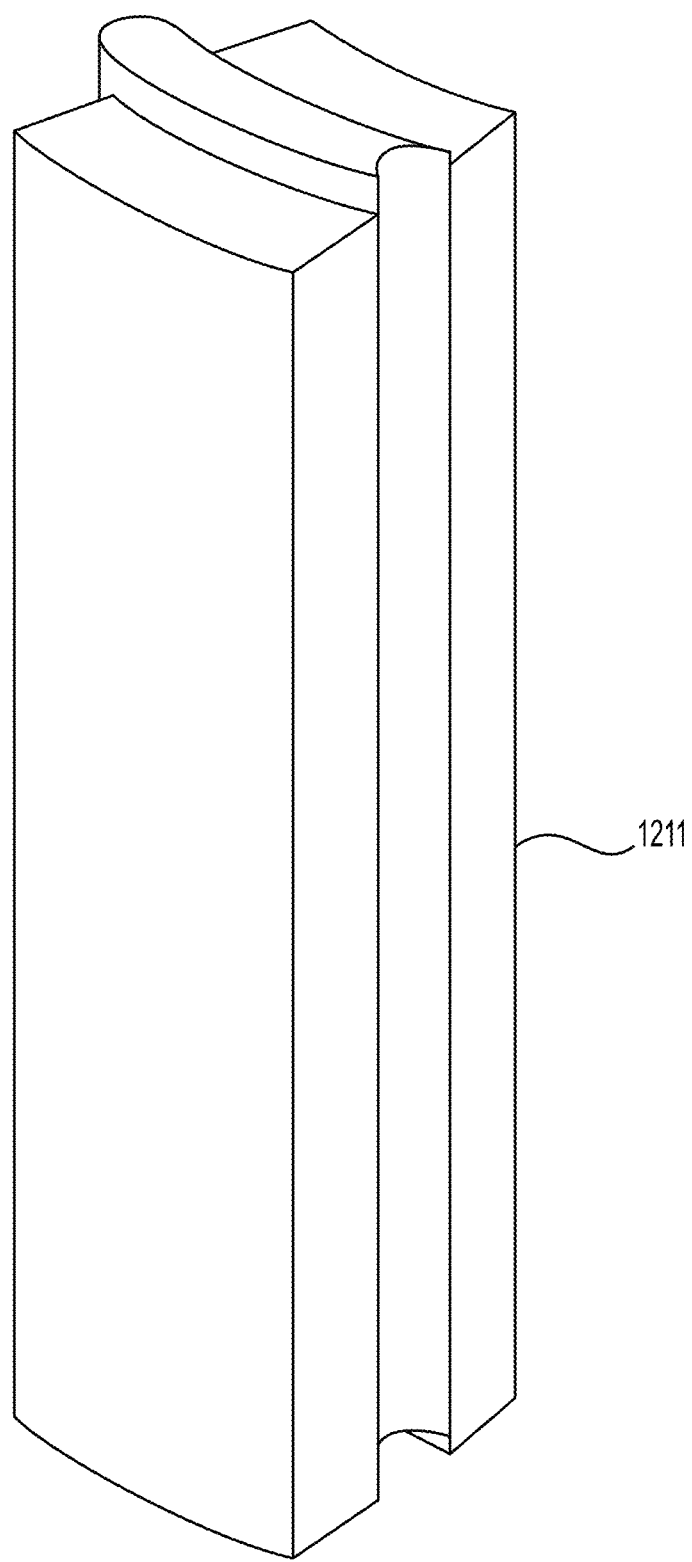
FIG. 7 is a perspective view illustrating a firebrick included in a first sidewall of the TES bin.
Figure 8:
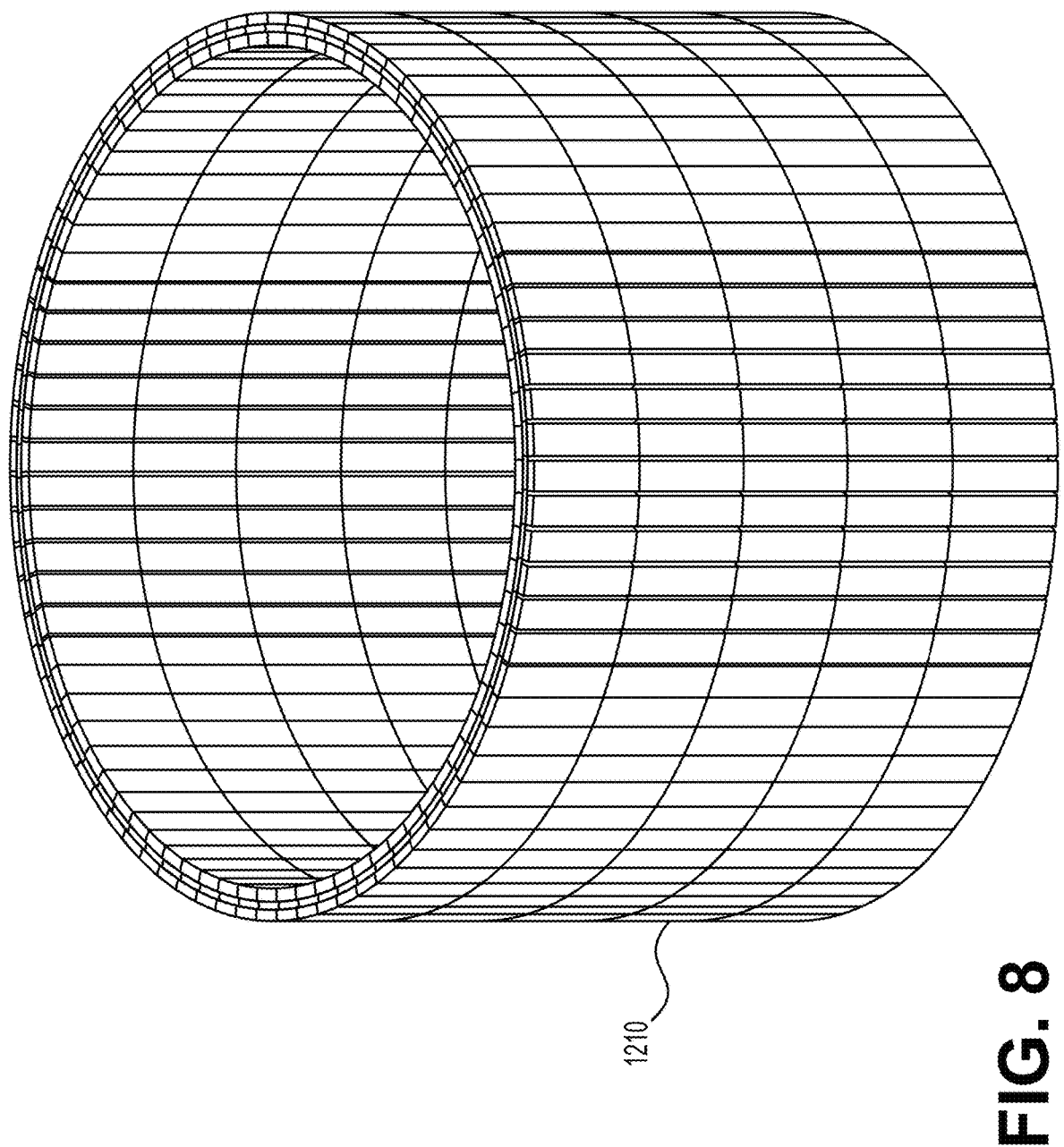
FIG. 8 is a perspective view illustrating the first sidewall of the TES bin in isolation.

FIG. 7 illustrates the configuration of an individual Mullite-based HDFB 1211 used in constructing the first layer 1210. FIG. 8 illustrates the first layer 1210 in isolation for clarity purposes.

As illustrated in FIG. 7 each Mullite-based HDFB 1211 may have a curved trapezoidal shape with a tongue and groove configuration on four side surfaces (e.g., the brick includes two tongues and two grooves as illustrated in FIG. 7 with the tongues and grooves preferably extending along the middle of the mating side surfaces). This enables each HDFB 1211 in the first layer 1210 to be securely interlocked with four adjacent bricks 1211 (i.e., one on top, one in the bottom, one to the left and one to the right). The tongue and groove configuration of the HDFBs 1211 in combination with the curved trapezoidal shape of each HDFBs forms a wall 1210 with a strong arch-like structure, mitigates the cracking of the bricks 1211 from thermal stress, strongly resists particulate abrasion, and eliminates the need for an additional liner.

The second layer 1220 is the main thermal insulator of the TES bin wall 1200. As such, the second layer 1220 is formed by using low-density calcium silicate blocks ("Ca—Si blocks" for brevity purposes) because said blocks have an excellent thermal insulation capability, a high operating temperature (>1000° C.), excellent mechanical stability, excellent thermal shock resistance, a light weight, and a relatively low cost (approximately \$400/m$^3$ of material).

Figure 9:
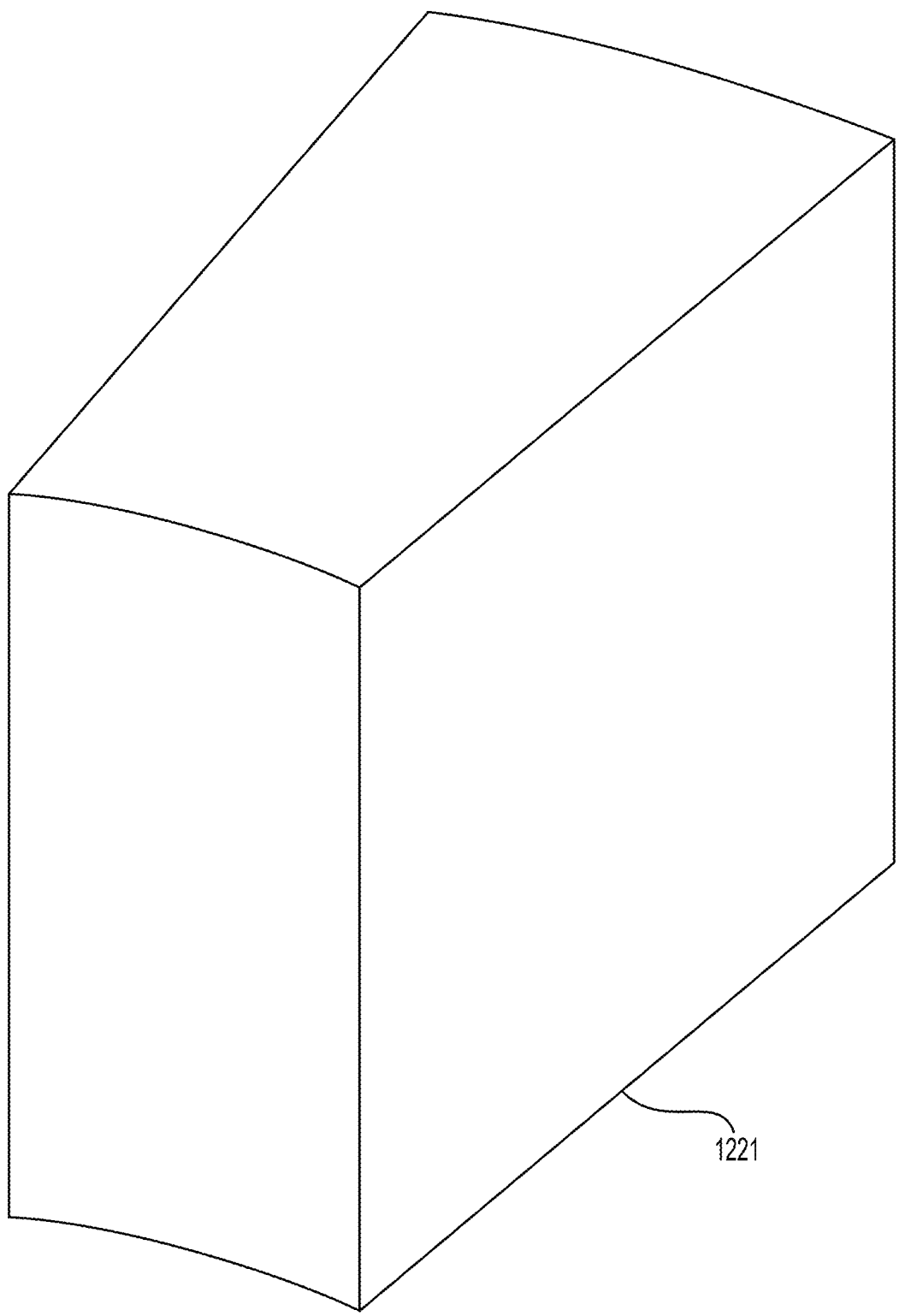
FIG. 9 is a perspective view illustrating a block included in a second sidewall of the TES bin.

Referring to FIG. 9, the Ca—Si blocks 1221 can be shaped to have a curved trapezoidal profile, similar to the Mullite-based bricks 1211 of the first layer 1210. The curved trapezoidal shape enables the Ca—Si blocks 1221 to improve the connection between the individual adjoining blocks 1221 and to form a complete arch-like structure in the wall 1220. This configuration further strengthens the integrity of the TES bin 1000 construction.

The thickness of the Ca—Si blocks 1221 can be determined based on an acceptable value of heat loss for the TES bin 1000. For example, the Ca—Si blocks 1221 can be designed to lose as little as about 1% of the total heat content of the TES bin 1000. The Ca—Si blocks 1221 may be thicker than the Mullite-based HDFBs 1211.

Figure 10:
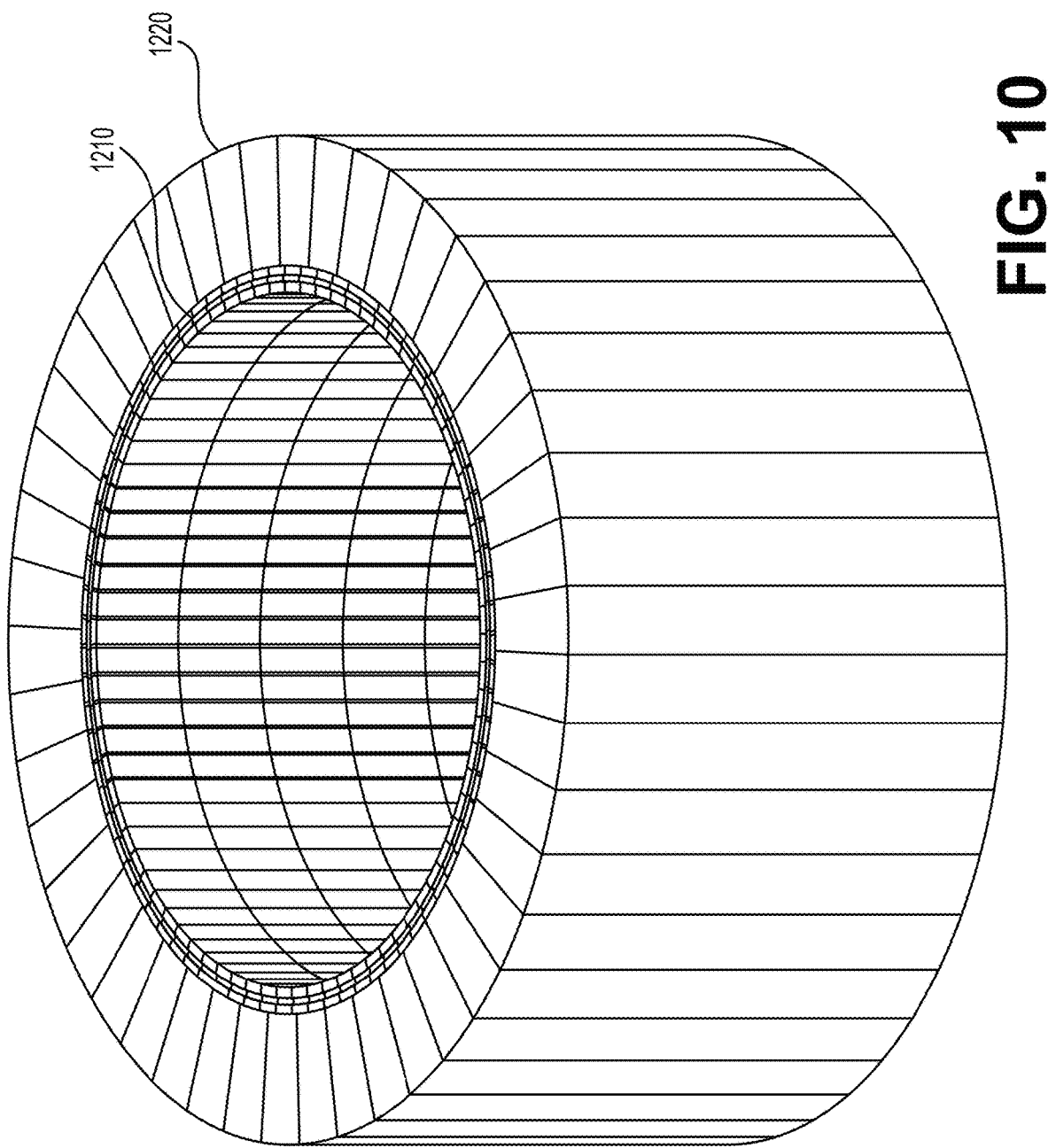
FIG. 10 is a perspective view illustrating the first and second sidewalls of the TES bin in isolation.

FIG. 10 illustrates the first and second layers 1210 and 1220 in isolation for clarity purposes.

The primary purpose of the third layer 1230 is to act as a damper, redirecting any generated thermal stresses in the TES bin 1000 to the fourth layer 1240 of the TES bin 1000. The third layer 1230 can include, for example, a flexible material that includes wood fiber and exhibits a high recovery (e.g., expansion) rate after being compressed. For example, the third layer 1230 may include a flexible and expandable joint material that includes wood fiber, made available for sale by the J D Russell Company (Tucson, Arizona), under the trademark FIBERFLEX. The temperature of the second layer 1220 should be about 80° C. or less at its interface with the third layer 1230. The third layer can include expansion joints. The reason for the incorporation of the expansion joints in the third layer 1230 is to control the thermal stresses in the first and second layers 1210 and 1220. More particularly, the expansion joints in the third layer 1230 ensure that first and second layers 1210 and 1220 experience thermal stresses in the outwardly direction (e.g., expanding toward the third layer) rather than inwardly. As a result, the HDFBs 1211 of the first layer 1210 and the Ca—Si blocks 1221 of the second layer 1220 are protected against crushing or damage that could otherwise occur if they pressed outwardly against the fourth layer 1240 when expanding from heat.

The fourth layer 1240 of the TES bin 1000 is configured to experience minimal thermal variation. The primary role of the fourth layer is to provide structural support for the TES bin 1000 and to absorb the net thermal stresses delivered by the third layer 1230. In other words, the fourth layer 1240 is designed to provide the necessary strength and stability to retain the bin 1000 structure in place. The fourth layer 1240 can be made of reinforced concrete, a metallic shell, or a combination thereof. When made out of reinforced concrete, the fourth layer 1240 can have a thickness ranging from, for example, about 20 cm to about 40 cm. It is understood that the present subject matter is not limited to these dimensions. The fourth layer 1240 can be the outermost layer of the TES bin wall 1200.

In sum, the combination of the first to fourth layers 1210-1240, including Mullite-based HDFBs 1211 in the innermost layer 1210, the Ca—Si blocks 1221 in the second layer 1220, the flexible wooden fiber material with expansion joints in the third layer 1230, and the reinforced concrete or metallic shell in the outermost layer 1240 optimizes the design of the TES bin 1000, addresses thermal stresses, meets insulation requirements, and provides ample structural integrity.

Figure 11:
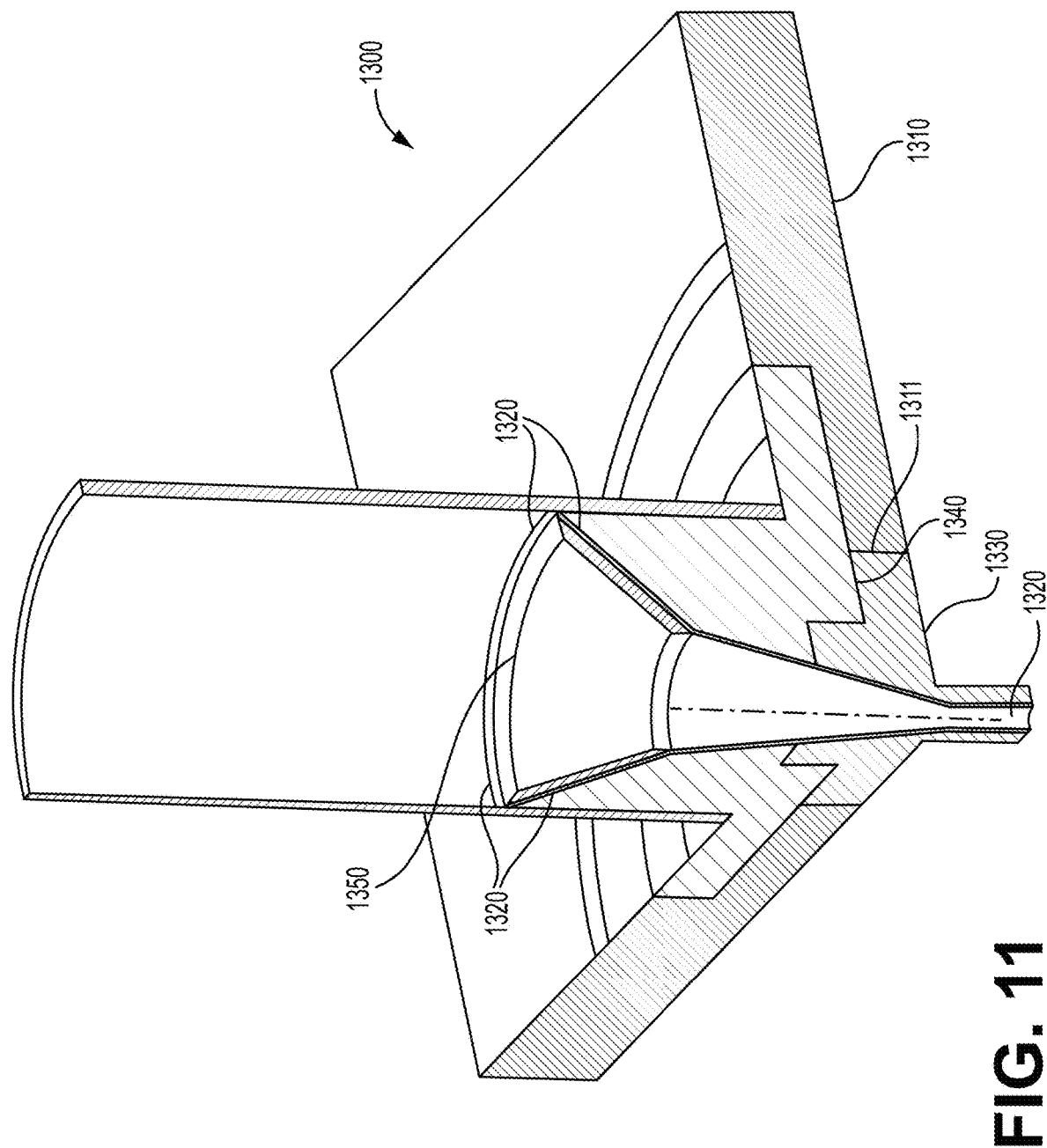
FIG. 11 is a perspective cutaway view illustrating the base and the first sidewall of the TES bin.
Figure 12:
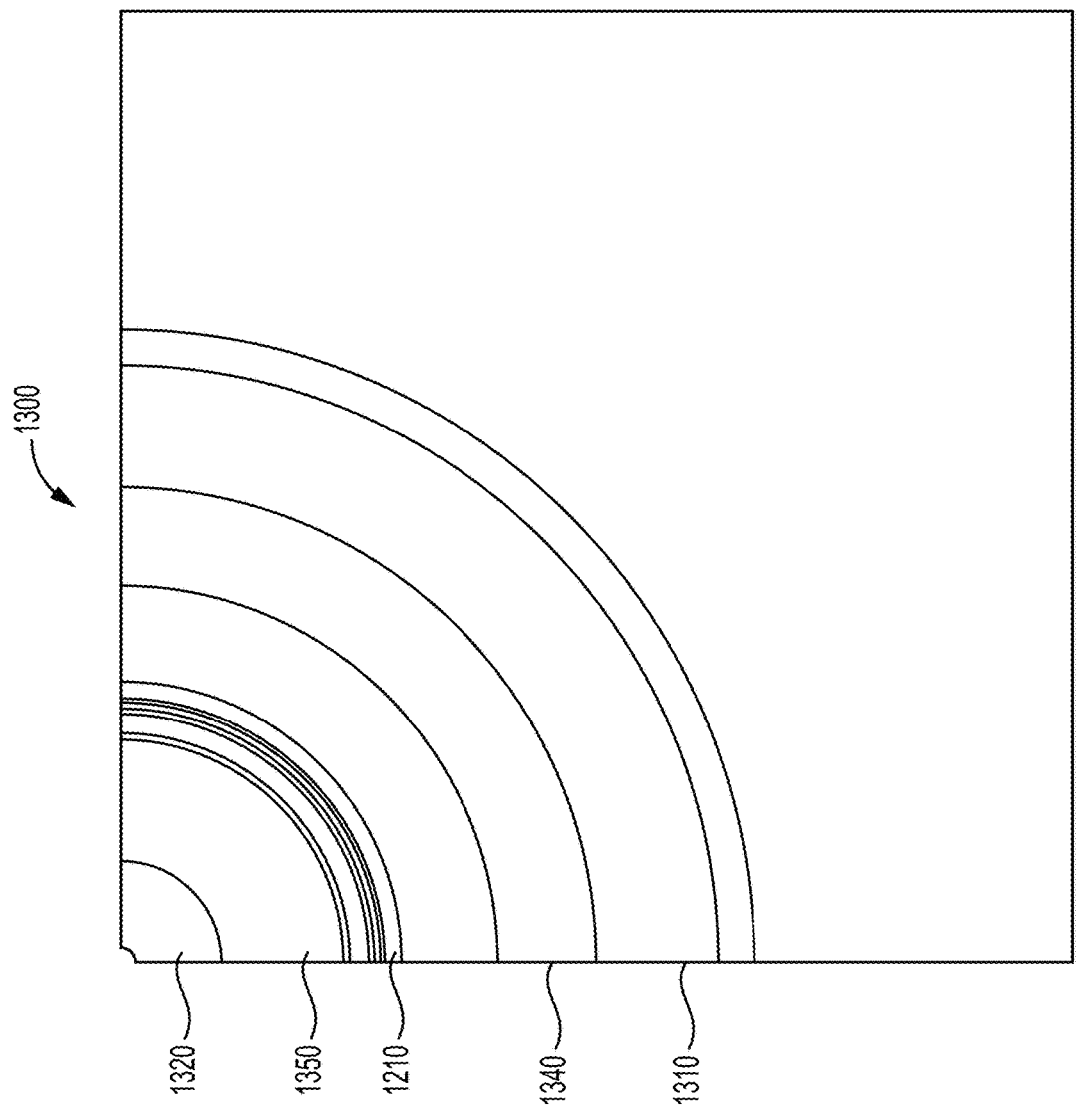
FIG. 12 is a top plan view of the cutaway of FIG. 11.

Referring to FIGS. 6, 11 and 12, the base 1300 includes a reinforced concrete (RC) platform 1310 with an opening 1311 therethrough, a funnel 1320 extending through the opening 1311, a block (or mass) of ceramic wool (CW) insulation 1330 sealing a gap between the funnel 1320 and the through opening 1311 in the RC platform 1310 all-around, a seat 1340 of insulating material disposed on the RC platform 1310 and on the CW insulation block 1330, the insulating seat 1340 filling the space between a top of the funnel 1320, the first layer 1210 of the TES bin body 1200 and an upper surface of the RC platform 1310 and CW insulation 1330. In other words, the seat of insulating material 1340 fills the space from an underside of the top of the funnel 1320 to the top of the RC platform 1310, and stretches laterally between an exterior of funnel 1320 to the inside of the innermost layer 1210.

The RC platform 1310 provides structural support to the TES bin 1000. In other words, the RC platform may be configured to support the weight of the TES bin 1000.

The seat 1340 may be made of Ca—Si material (e.g., Ca—Si blocks or bricks) in order to protect the RC platform 1310 of the base 1300 below from heat and to reduce heat losses in the TES bin 1000. Particularly, a thickness of the Ca—Si seat 1340 should be sufficient to keep the temperature of the RC platform 1310 below 80° C., thereby preventing potential heat damage to it. As illustrated in FIGS. 6, 11 and 12, the Ca—Si seat 1340 and the CW insulation block 1330 may have a step-like shape.

As illustrated in FIGS. 6 and 11, the funnel 1320 may extend through a vertical (or substantially vertical) opening in the Ca—Si seat 1340 and through a vertical (or substantially vertical) opening in the CW insulation. The funnel 1320 has a conical shape in order to increase the discharging efficiency of the TES bin 1000 to nearly 1100%. The funnel 1320 may be made of nickel-based superalloys, stainless steel grade 309, or similar alloys. As an example, the funnel 1320 may be made of Inconel, a product trademarked by the Special Metals Corporation and containing nicked-based superalloys. The funnel 1320 serves the dual purpose of efficiently guiding the particulate flow downwardly and protecting the Ca—Si seat from abrasion or impingement caused by the particles.

As illustrated in FIGS. 6 and 11, the base 1300 may also include a layer 1350 of Mullite-based HDFBs disposed on an upper portion of the funnel 1320. The HDFBs of the layer 1350 may be shaped in order to form a perfect conically-shaped covering layer over the upper portion of the funnel when laid adjacent to one another, thereby being securely positioned over the funnel 1320. The HDFB layer 1350 is utilized as an additional protective layer over the funnel 1320, adding integrity to the base 1300.

The use of a Ca—Si seat 1340, the conical discharge design of the base 1300, the metallic funnel 1320, and the HDFB layer 1350 in the bin base 1300 optimize thermal protection and increase discharging efficiency and structural integrity.

The configuration of the TES bin 1000 simplifies the construction of the bin, it prevents internal erosion and cracks from occurring in the bin, facilitates an efficient discharge of particulates, and reduces heat losses in the particulates flowing therethrough by providing sufficient heat insulation.

Figure 13:
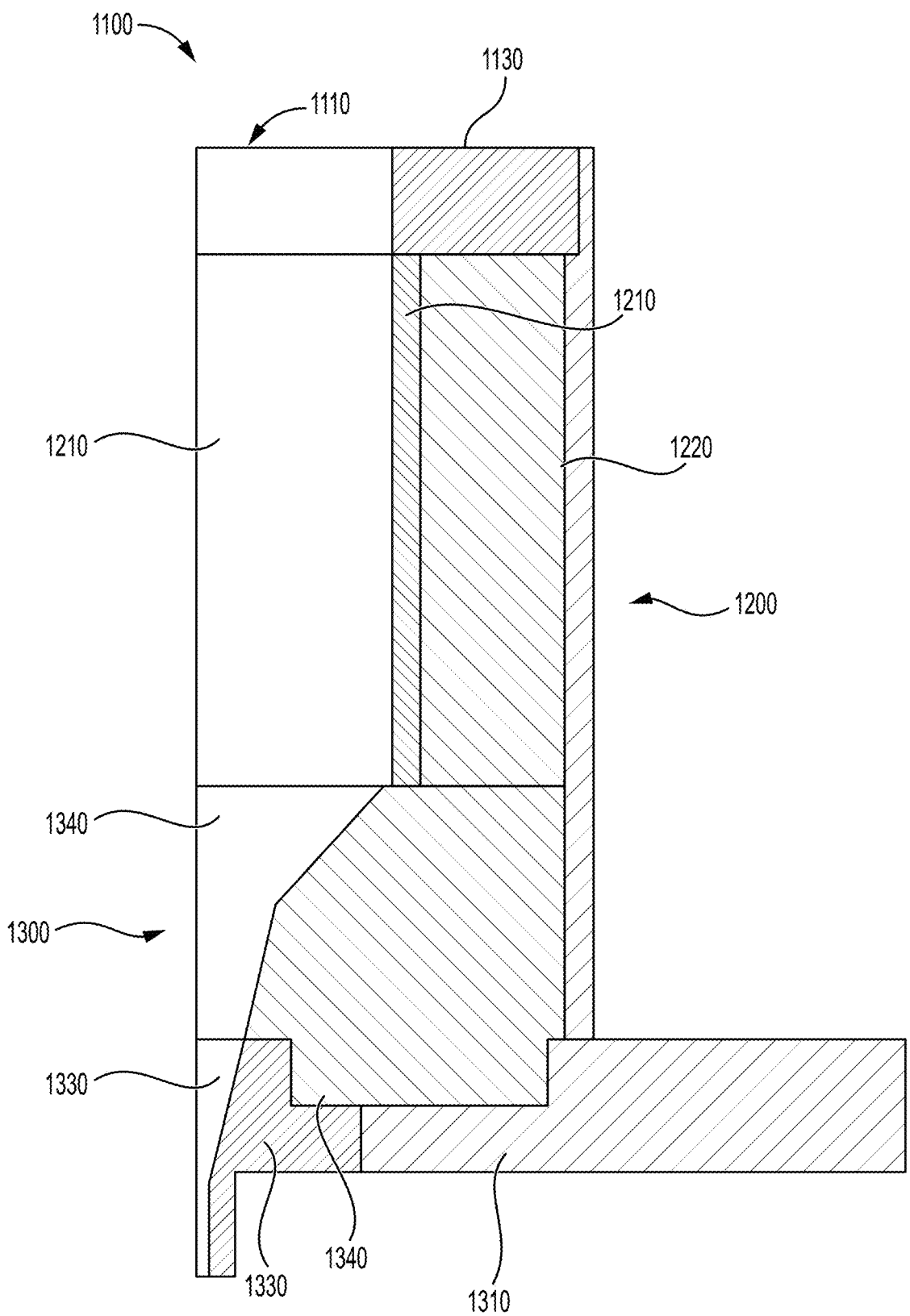
FIG. 13 is a cross-sectional view of a TES bin according to an exemplary embodiment of the present subject matter.
Figure 14:
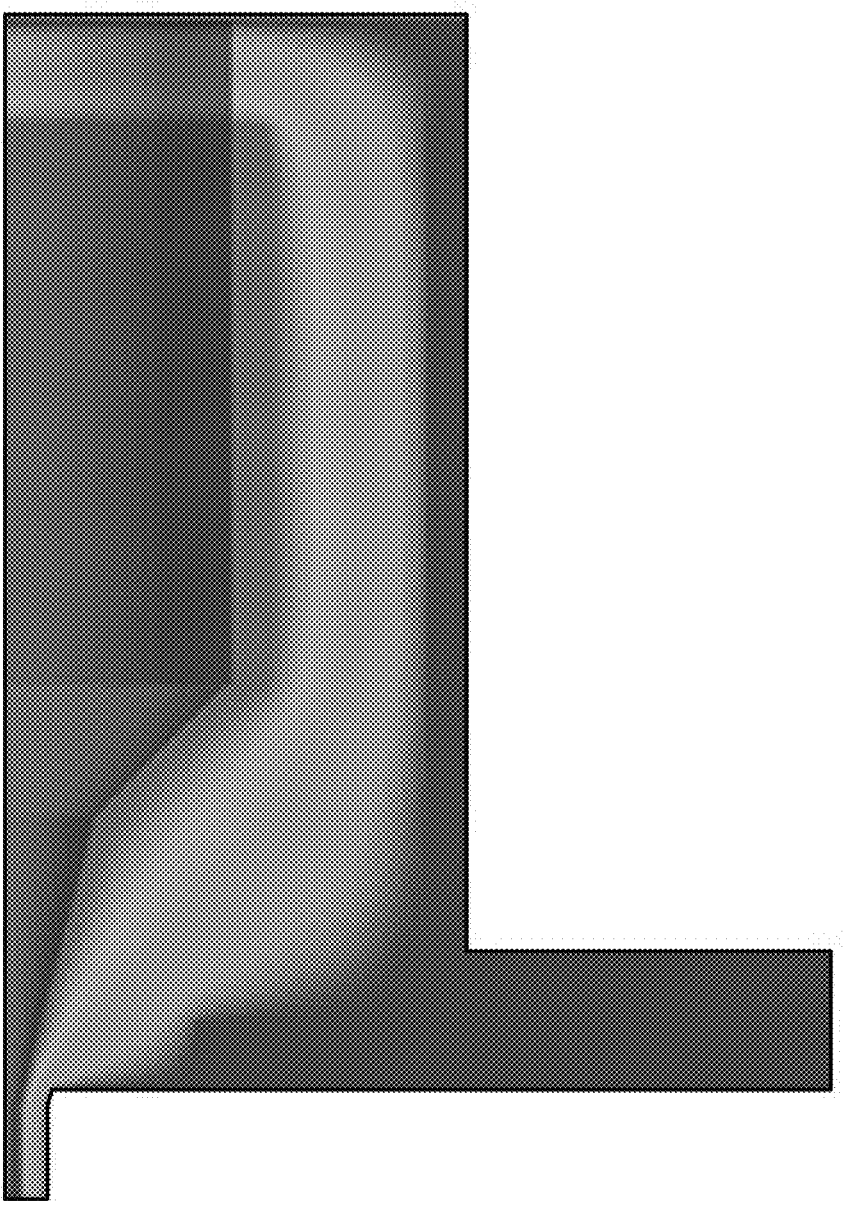
FIG. 14 is a heat image map illustrating the results of a finite element model study of the thermal insulation property of the TES bin of FIG. 13.
Figure 15:
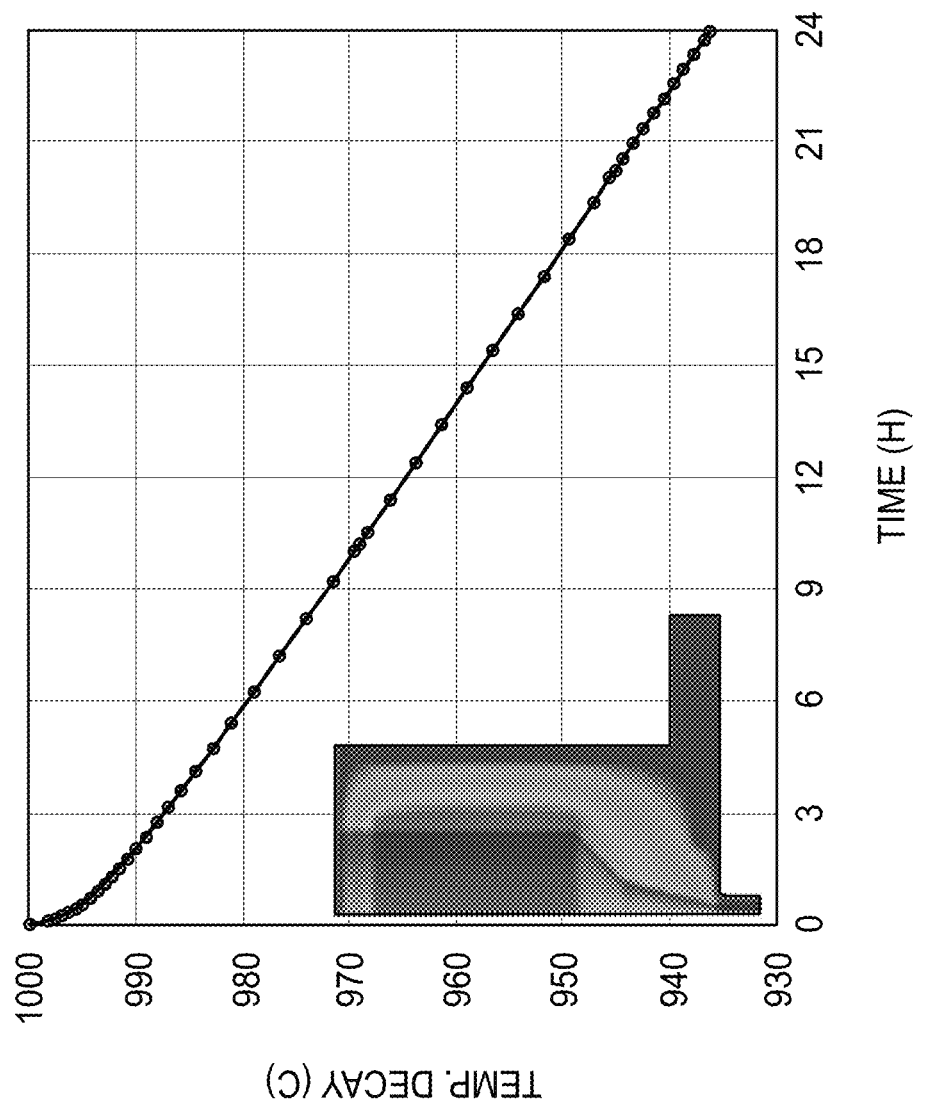
FIG. 15 is a graph illustrating the temperature decay versus time in the model of FIG. 14.

Concerning the insulative capability of the TES bin 1000, FIG. 13 illustrates a finite element model result of the thermal insulation property of the TES bin 1000 of the present subject matter based on predetermined and exemplary dimensions assigned to the components of the TES bin 1000. For example, the TES bin 1000 may have a 12 cm thick Mullite-based HDFB innermost layer 1210, a 60 cm thick Ca—Si block second layer 1220 and a Ca—Si seat 1340 greater than 60 cm in the base 1300.

As illustrated in FIG. 13, the design of the TES bin 1000 with the dimensions above demonstrates an effective heat leak reduction through the bin's walls 1200. Specifically, the analysis indicates a temperature drop of less than 70° C. on the innermost layer, clearly indicating that the insulation properties and design features of the TES bin 1000 are successful in minimizing heat transfer from the interior to the surrounding environment.

The feeder assembly 3000 is also configured to reduce heat losses in the power plant, and will be described in detail below.

Figure 2:
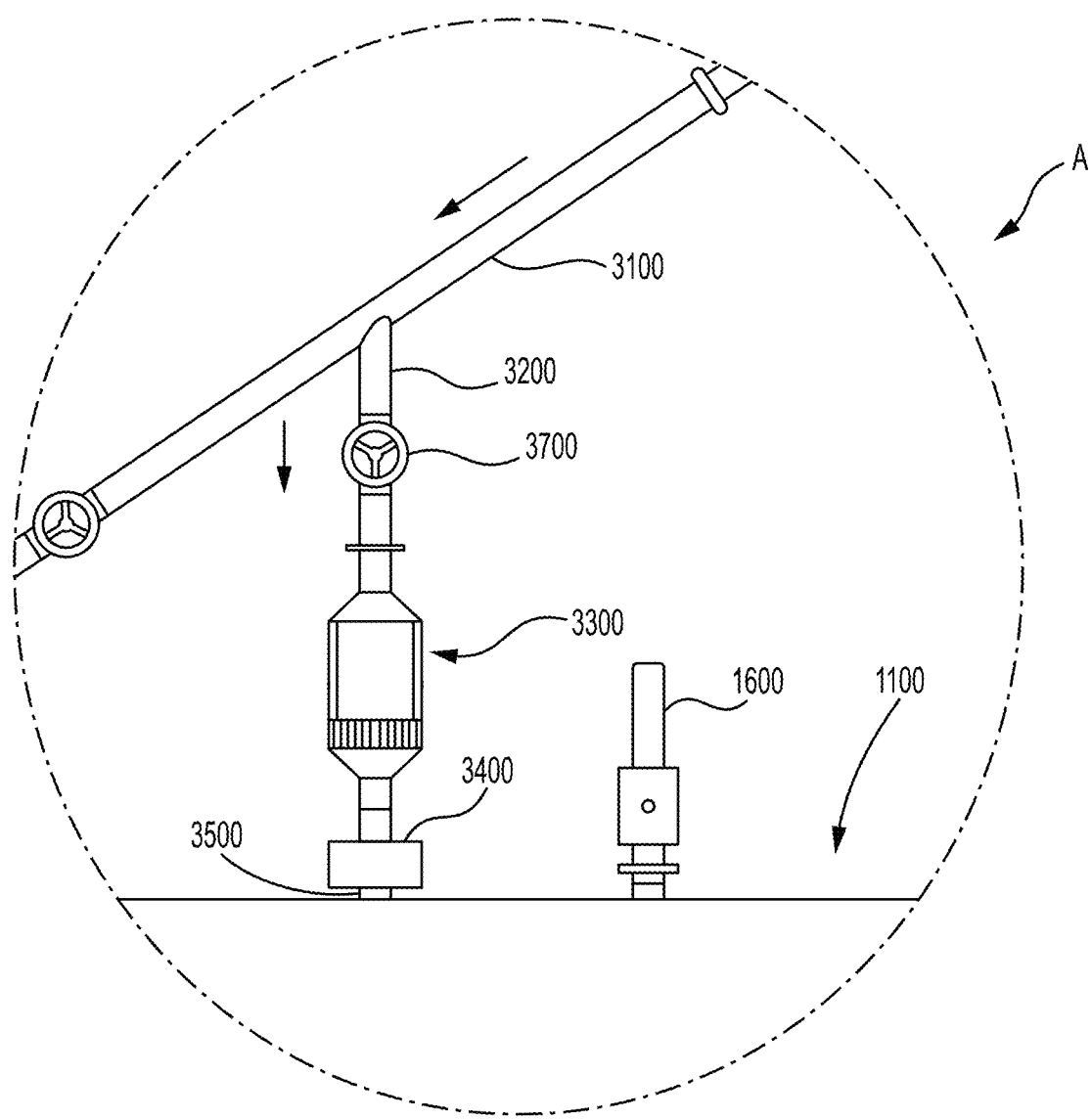
FIG. 2 is a magnified view of region "A" of FIG. 1, illustrating a bin feeder assembly.

Referring to FIG. 2, the feeder assembly 3000 includes conduits 3100 and 3200, an intermediate hopper 3300 connected downstream of conduit 3200, a weight-operated door structure 3400 connected downstream of the intermediate hopper 3300, and an additional conduit 3500 connecting the weight-operated door structure 3400 with the TES 1000 (e.g., the additional conduit 3500 extends downwardly through the TES bin lid 1100 in order to enable the particles that have passed through the weight-operated door structure 3400 to be discharged into the TES bin interior 1400).

Conduit 3200 may include a valve 3700 along its length in order to control the flow of particles into the TES bin 1000. The valve 3700 can be operated (e.g., selectively opened and closed or manipulated to be in a partially opened state) in order to substantially reduce or eliminate the amount of entrained air into the TES bin 1000 and/or air loops that can form when hot particles are filled into the TES bin 1000. Entrained air that can flow into the TES bin 1000 when the bin 1000 is filled with hot particles and air loops that may form during the filling process are a significant source of heat loss in the TES bin 1000. Therefore, by controlling the flow rate of hot particles into the TES bin 1000 via the valve 3700 (among other components of the feeder assembly 3000) and/or by allowing particles to flow into the TES bin 1000 at intermittent time intervals, the amount of entrained air entering the TES bin 1000 can be substantially reduced and air loops in the TES bin 1000 may be virtually eliminated. This, in turn, can lead to a significant reduction in the amount of entrained air that enters the TES bin 1000. Therefore, the selective operation of the valve 3700 can significantly increase the overall operational efficiency of the power plant.

More particularly, in a commercial operation of a solar power plant where the TES bin 1000 is expected to be empty every morning, the loss of heat that can otherwise occur due to the entrained air and air loops that can form when filling the TES bin 1000 from an empty state can be large. The controlled filling of the empty TES bin 1000 via the valve 3700 is important because it drastically reduces heat losses during the filling process and thereafter during operation of the plant.

The intermediate hopper 3300 serves to filter the particle stream from impurities and to further reduce heat losses in the power plant by restricting the flow of air therethrough.

Figure 3:
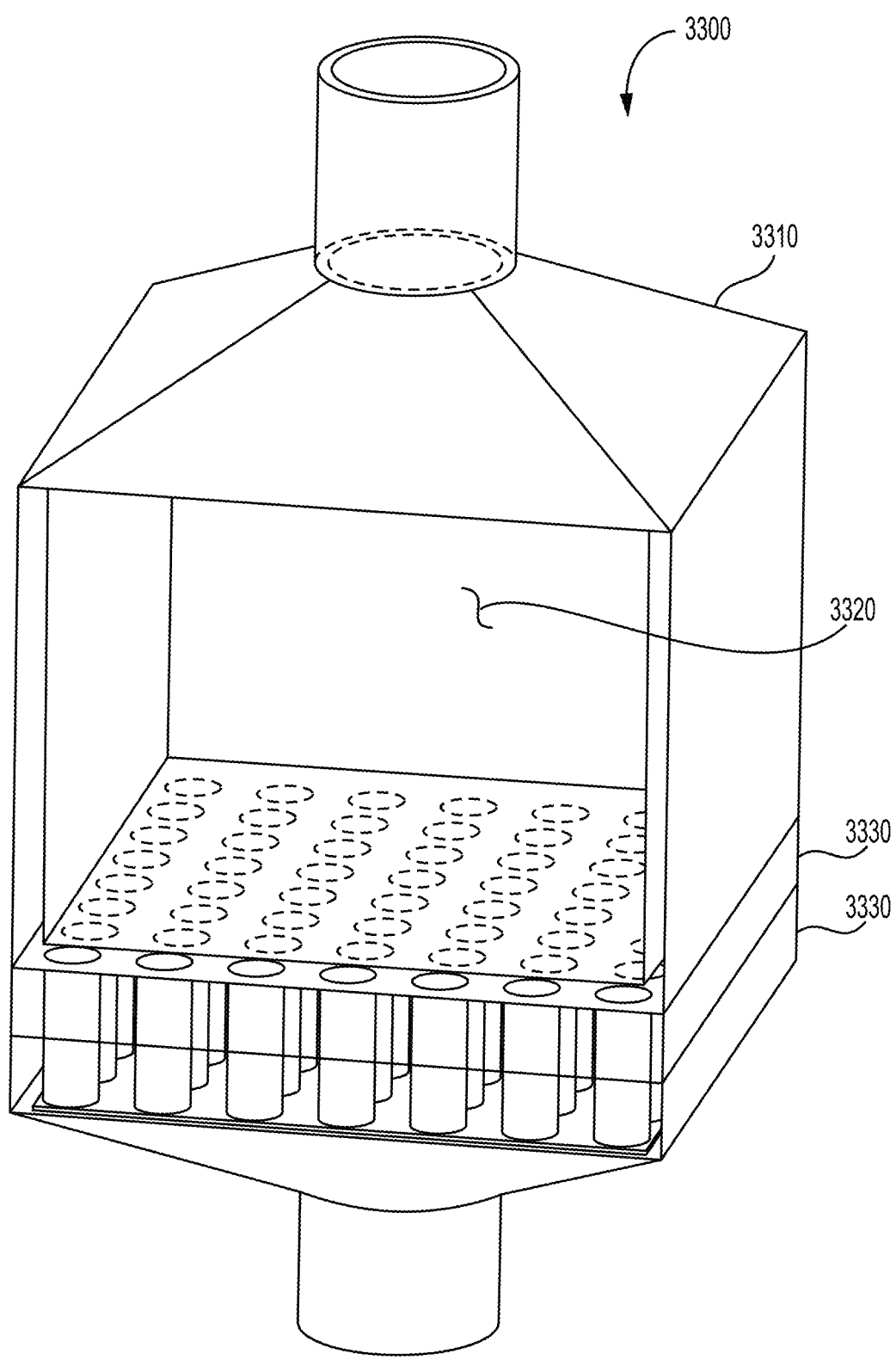
FIG. 3 is a perspective view illustrating a hopper included in the bin feeder assembly of FIG. 2.

Referring to FIG. 3, the intermediate hopper 3300 forms an enclosed and/or insulated chamber 3310 with an interior area 3320 and a plurality of filter layers 3330 disposed adjacent to a downstream end of the hopper (e.g., adjacent to a bottom of the hopper) and stacked upon one another.

Figure 4A:
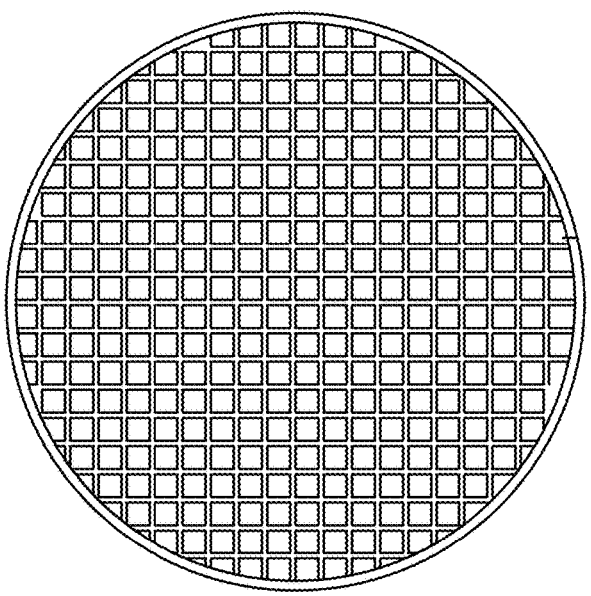
FIG. 4A is a top view illustrating a first filtering medium that can be included in the hopper of FIG. 3.
Figure 4B:
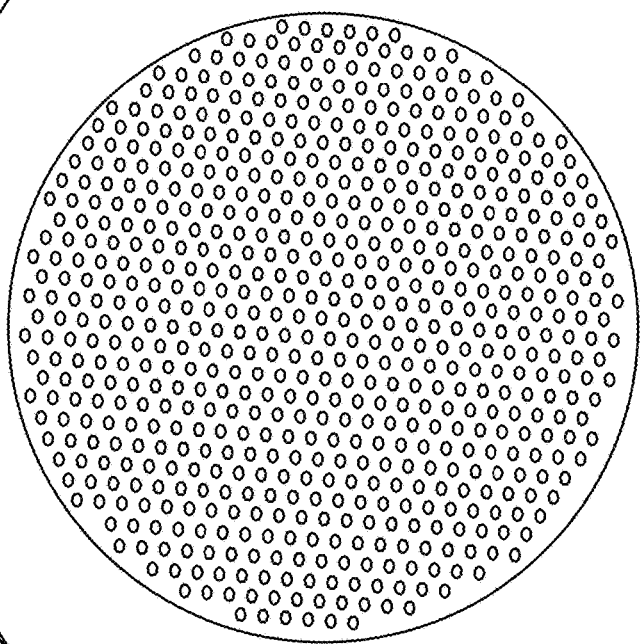
FIG. 4B is a top view illustrating a second filtering medium that can be included in the hopper of FIG. 3.
Figure 4C:
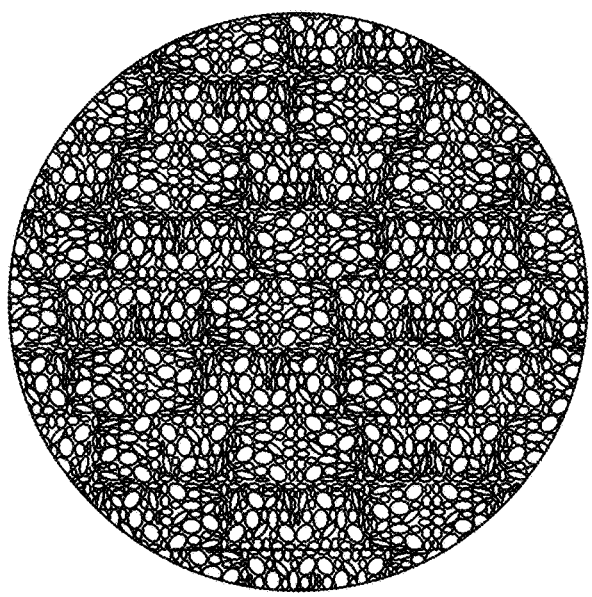
FIG. 4C is a top view illustrating a third filtering medium that can be included in the hopper of FIG. 3.

Each filter layer 3330 in the hopper 3300 may expand throughout the entire cross-sectional area of the hopper in order to filter all of the particles flowing downstream to the TES bin 1000. Each filter layer 3330 may include a silicon carbide (SiC) foam layer (or foam pieces) for filtering impurities of different sizes from the particulate stream. FIGS. 4A-4C illustrate SiC foam media with various configurations for filtering impurities from the hot particulate stream. Each filter layer 3330 may include one or more of the SiC foam filters illustrated in FIGS. 4A-4C. Each filter layer 3330 may also include a combination of different SiC foam filters.

Each filter layer 3300 may be secured to a drawer-like structure that is configured to be slidably inserted into the interior 3320 of the hopper 3300. This configuration enables each layer 3330 to be selectively insertable into the hopper and selectively removable from the hopper's interior 3320 (e.g., horizontally, like a drawer) for maintenance purposes in order to enable inspection of the SiC foams and cleaning and/or replacement thereof as needed. This can avoid clogging of the SiC filters, thereby, ensuring a smooth operation of the power plant.

The filter layers 3330 may be provided in plural in order to enable the hopper 3300 to remain operational during maintenance when one of the filter layers 3330 is removed for inspection/replacement since the remaining filter layer(s) 3330 would be able to filter the particulates flowing therethrough.

During the operation of the power plant, the hopper 3300 is filled entirely with particles in order to substantially prevent entrained air from entering the TES bin 1000 downstream with the flow of the hot particles. In addition, the formation of air loops in the hopper 3300 and in the TES bin 1000 downstream is significantly reduced or eliminated by operating the hopper 3300 in a full or almost full capacity.

The SiC foam filters in the filter layers 3330 also resist the upwardly flow of hot air through the foams. This reduces heat losses in the plant. The stacking of a plurality of filter layers 3330 on top of one another reduces the upwardly flow of hot air even more.

Figure 5:
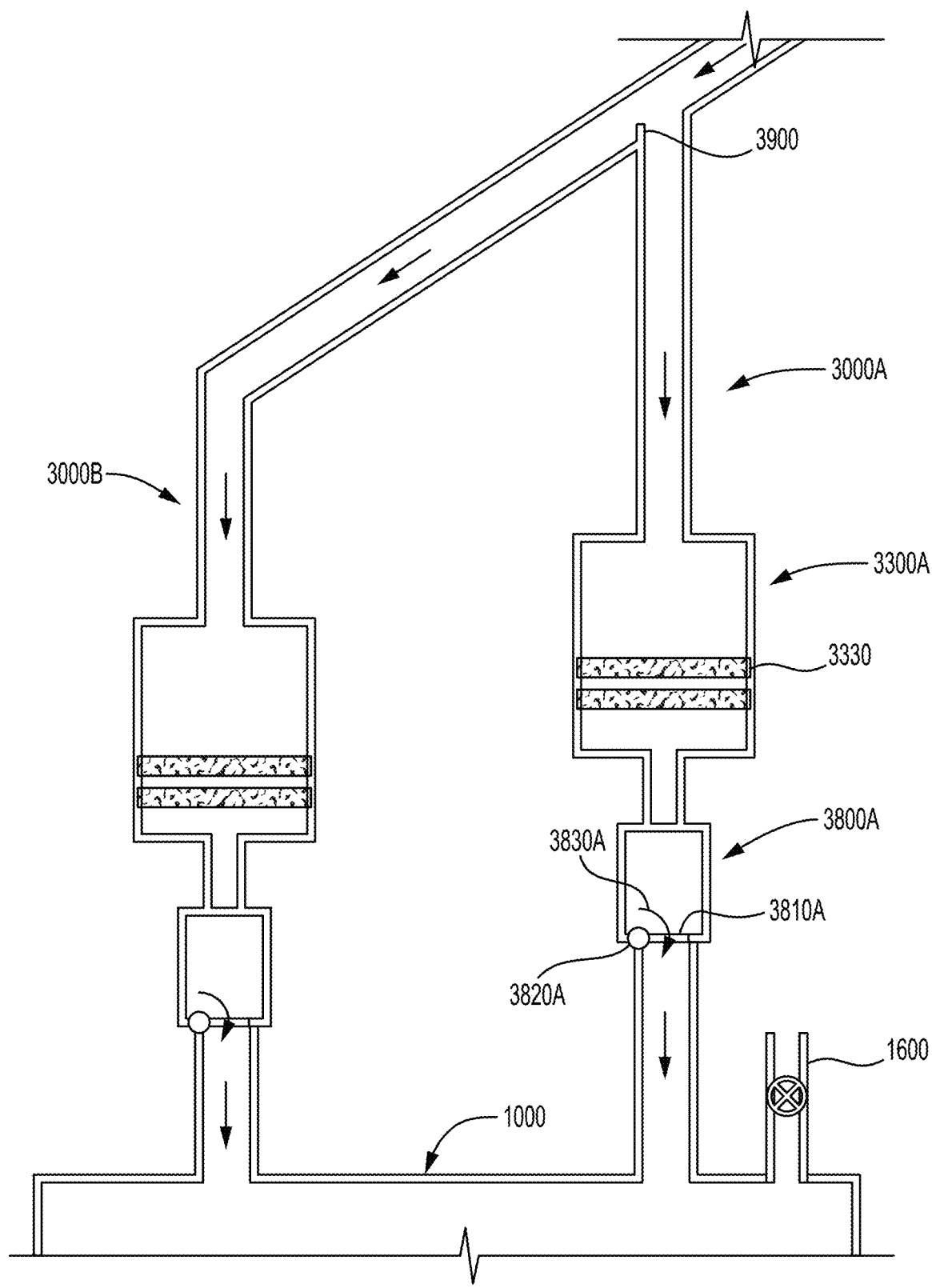
FIG. 5 is a side view illustrating a bin feeder assembly according to an embodiment of the present subject matter.

The weighted door structure (illustrated in FIG. 5 as structure no. 3800A) may be housed in a chamber located downstream of the hopper (hopper 3300 as illustrated in FIG. 5). Referring to FIG. 5, the weighted door structure 3800A may include a spring loaded (or weighted) door 3810 extending horizontally or substantially horizontally in a chamber defined by the structure 3800A. The weighted door 3810A may be connected to the structure 3800A via hinge 3820A (e.g., at the bottom of the structure 3800A), and is configured to remain normally closed due to the tension of the spring. The weighted door 3810A is configured to open when a sufficient mass of hot particles (flowing downstream from the hopper) accumulates on top of it, as indicated by the curved arrow 3830A. In other words, the accumulated mass of particles overcomes the resistance of the spring, causing the weighted door 3810A to pivot to an open position and enable the accumulated particles to flow downstream into the TES bin 1000. The spring tension then causes the now-lighter door 3810A to return to its normally closed state.

The gravity-operated selective opening and closing of the weighted door 3810A increases operational efficiency be reducing the amount of entrained air that enters the TES bin 1000 and by reducing the formation of air loops into the TES bin 1000 by closing the path of flow between the door and the interior of the TES 1000 while a sufficient amount of particles accumulates thereon for discharging into the bin 1000.

The structure of the TES bin feeder, which includes the selective operation of valve, the intermediate hopper with the SiC filter layers and the weighted door structure significantly reduces or eliminates the introduction of entrained air into the TES bin 1000 and the formation of air loops inside of the TES bin 1000.

In an embodiment of the present subject matter, as illustrated in FIG. 5, a power plant can be provided with more than one TES bin feeder assembly 3000. For example, as illustrated in FIG. 5, a power plant can be provided with two TES bin feeder assemblies 3000A and 3000B. The purpose of the dual feeder assembly design is to enable the power plant to operate without interruption when one of the feeder assemblies must be closed for maintenance or other purposes.

Referring to FIG. 5, a first TES feeder assembly 3000A and a second TES feeder assembly 3000B can be connected in common to a conduit that transmits hot particles toward the TES bin 1000. For example, the TES feeder assembly 3000A can be a primary feeding line and the feeder assembly 3000B can be a backup line. A diaphragm 3900 (or gate, or valve) can be installed at a common connection between the feeder assemblies 3000A and 3000B and the conduit that transmits hot particles downwardly from the PHR 2000. The diaphragm 3900 can be selectively operated to close the TES feeder assembly 3000A and open the TES feeder assembly 3000B so that hot particles can flow into the TES bin 1000 from the feeder assembly 3000A, or vice-versa. Alternatively, or in addition, and when desired, the diaphragm 3900 can be operated to open both feeder assemblies 3000A and 3000B (whether fully or partially open) or to close both feeder assemblies 3000A and 3000B.

While both feeder assemblies 3000A and 3000B are illustrated as being connected in common to the PHR 2000 feeding conduit, it is understood that they can also be separately connected to the PHR 2000 feeding conduit. Elements, components, parts, etc., not described in detail with respect to the dual feeder assembly configuration may be assumed to be similar to or the same as corresponding elements, components, parts, etc., described in other parts of the specification.

The configuration of the TES bin 1000 and the configuration of the TES bin feeder assembly(ies) 3000, 3000A, 3000B, described in this specification increases the operational efficiency of a hot particle solar power plant while enabling the safe operation of the TES bin 1000, facilitating maintenance and preventing potential disruptions in the operation of the plant due to maintenance that the TES bin 1000 and its feeder assembly(ies) may require from time to time.

While the present invention has been particularly shown and described with reference to exemplary embodiments thereof, it will be apparent to those of ordinary skill in the art that various changes in form and detail may be made therein without departing from the spirit and scope of the present invention as defined by the following claims.

What is claimed is:

1. A thermal energy storage (TES) bin assembly for a high temperature, particle-based solar power plant, the TES bin assembly including a TES bin, the TES bin including:
    a base;
    a lid separated from the base; and
    a hollow body extending between the base and the lid, the hollow body including:
        a first hollow structure extending between the base and the lid and defining an interior of the TES bin in conjunction with the base and the lid, and
        a second hollow structure extending between the base and the lid and disposed on an exterior of the first hollow structure,
    wherein the base includes:
        a supporting platform with a through opening,
        a funnel extending through the through opening in the supporting platform,
        a seat of insulating material disposed on the supporting platform, the seat of insulating material having a through opening in which the funnel extends, and the seat of insulating material fills a space between an exterior of the funnel, a top of the supporting platform and an interior of the first hollow structure, and
        a layer of Mullite-based HDFBs disposed on an upper portion of the funnel.

2. The TES bin assembly of claim 1, wherein the first hollow structure is made of a plurality of Mullite-based high duty firebricks (HDFBs).

3. The TES bin assembly of claim 2, wherein the second hollow structure is made of a plurality of calcium silicate (Ca—Si) blocks.

4. The TES bin assembly of claim 3, wherein the second hollow structure is thicker than the first hollow structure.

5. The TES bin assembly of claim 1, wherein the hollow body further includes a third hollow structure extending between the base and the lid and disposed on an exterior of the second hollow structure.

6. The TES bin assembly of claim 5, wherein the third hollow structure includes at least one expansion joint.

7. The TES bin assembly of claim 5, wherein the hollow body further includes a fourth hollow structure extending between the base and the lid and disposed on an exterior of the third hollow structure.

8. The TES bin assembly of claim 7, wherein the fourth hollow structure is made of reinforced concrete or a metal.

9. The TES bin assembly of claim 1, further including a feeder assembly connected to the TES bin, the feeder assembly providing a path for particles to enter the interior of the TES bin, the feeder assembly including a hopper having an interior with at least one particle filtering medium inside.

10. The TES bin assembly of claim 9, wherein the feeder assembly further includes a weighted door downstream of the hopper.

11. The TES bin assembly of claim 9, wherein the feeder assembly further includes a valve upstream of the hopper, the valve being selectively operatable to adjust a flow of the particles into the hopper.

12. The TES bin assembly of claim 1, further including a first feeder assembly connected to the TES bin and providing a first path for particles to enter the interior of the TES bin, and a second feeder assembly connected to TES bin and providing a second path for particles to enter the interior of the TES bin,
    wherein each one of the first and second feeder assemblies includes a hopper having an interior with at least one particle filtering medium inside.

13. The TES bin assembly of claim 1, wherein the lid of the TES bin includes:
    a first fixed lid portion disposed on the hollow TES bin body, the first lid portion having an opening therethrough, and
    a second lid portion insertable in the through opening of the first lid portion and configured to be removably coupled to the first lid portion in order to selectively seal the TES bin interior and to selectively provide access to the TES bin interior.

14. A thermal energy storage (TES) bin, comprising:
    a base;
    a lid disposed above the base; and
    a hollow multi-component body extending between the base and the lid, the components of the body including:
        a first hollow structure extending between the base and the lid and defining an interior of the TES bin in conjunction with the base and the lid,
        a second hollow structure extending between the base and the lid and disposed on an exterior of the first hollow structure, and
        a third hollow structure extending between the base and the lid and disposed on an exterior of the second hollow structure, wherein the base includes a calcium silicate (Ca—Si) seat with an opening extending therethrough and a metallic funnel disposed on the Ca—Si seat and extending through the opening in the Ca—Si seat.

15. The TES bin of claim 14, wherein the first and second hollow structures include different materials from one another.

16. The TES bin of claim 15, wherein the third hollow structure includes at least one expansion joint.

17. A thermal energy storage (TES) bin assembly for a high temperature, particle-based solar power plant, the TES bin assembly including:
    a TES bin; and
    a feeder assembly connected to the TES bin and providing a path for hot particles to enter an interior of the TES bin,
    wherein the TES bin includes:
        a base;
        a lid separated from the base; and
        a hollow multi-component body extending between the base and the lid, the components of the body including:
            a first hollow structure extending between the base and the lid and defining the interior of the TES bin in conjunction with the base and the lid of the TES bin,
            a second hollow structure extending between the base and the lid and disposed on an exterior of the first hollow structure, the first and second hollow structures including a different material from one another, and
            a third hollow structure extending between the base and the lid and disposed on an exterior of the second hollow structure, the third hollow structure having at least one expansion joint, and
    wherein the feeder assembly includes:
        a hopper having an interior with at least one particle filtering medium inside, the at least one particle filtering medium disposed on a holding structure that is removably inserted in the hopper, and
        a weighted door disposed downstream of the hopper.

\* \* \* \* \*